United States Patent
Mathew (10) Patent No.: US 12,200,072 B2
(45) Date of Patent: *Jan. 14, 2025

(54) IDENTIFYING OUTDATED CLOUD COMPUTING SERVICES

(71) Applicant: Capital One Services, LLC, McLean, VA (US)

(72) Inventor: Divya Mathew, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,120

(22) Filed: Nov. 6, 2023

(65) Prior Publication Data

US 2024/0073291 A1 Feb. 29, 2024

Related U.S. Application Data

(63) Continuation of application No. 18/159,181, filed on Jan. 25, 2023, now Pat. No. 11,888,945, and a continuation of application No. 17/308,731, filed on May 5, 2021, now Pat. No. 11,570,263.

(51) Int. Cl.
*H04L 67/51* (2022.01)
*G06F 16/245* (2019.01)
*H04L 67/00* (2022.01)

(52) U.S. Cl.
CPC ............ *H04L 67/51* (2022.05); *G06F 16/245* (2019.01); *H04L 67/34* (2013.01)

(58) Field of Classification Search
CPC ........ H04L 67/51; H04L 67/34; G06F 16/245
See application file for complete search history.

(56) References Cited

U.S. PATENT DOCUMENTS

| | | |
|---|---|---|
| 8,959,221 B2 | 2/2015 | Morgan |
| 11,570,263 B2 | 1/2023 | Mathew |
| 2012/0290348 A1 | 11/2012 | Hackett et al. |
| 2017/0099191 A1 | 4/2017 | Stella et al. |
| 2018/0067736 A1 | 3/2018 | De et al. |

(Continued)

OTHER PUBLICATIONS

Anonymous, "AWS Cloud Cost Management & Optimization Tools," Totalcloud, retrieved Apr. 1, 2021,6 pages, https://www.totalcloud.io/solutions/cost-management.

(Continued)

*Primary Examiner* — Benjamin M Thieu
(74) *Attorney, Agent, or Firm* — Harrity & Harrity, LLP (57) ABSTRACT

A cloud tracking system may store configuration data separately for each account of multiple accounts that an entity has with a cloud computing provider and may aggregate the configuration data into a data structure that stores the configuration data together for the multiple accounts. The cloud tracking system may receive a request that includes a user identifier of a user associated with the entity and may search for the user identifier in the data structure. The cloud tracking system may identify a set of deployed cloud computing services associated with the user identifier based on searching for the user identifier in the data structure, wherein the set of deployed cloud computing services is associated with more than one account of the multiple accounts. The cloud tracking system may identify one or more deployed cloud computing services, of the set of deployed cloud computing services, that are outdated.

20 Claims, 8 Drawing Sheets

(56) References Cited

U.S. PATENT DOCUMENTS

2020/0252475 A1     8/2020   Marndi et al.
2021/0352136 A1    11/2021   Dojka et al.
2023/0171324 A1     6/2023   Mathew

OTHER PUBLICATIONS

"Create Alarms to Stop, Terminate, Reboot, or Recover an EC2 Instance," Amazon CloudWatch; retrieved Apr. 1, 2021,6 pages, Amazon Web Services, Inc, https://docs.aws.amazon.com/AmazonCloudWatch/latestlmonitoring/UsingAlarmActions.html.
Fu et al., "Janitor Monkey-Keeping the Cloud Tidy and Clean," Netflix Technology Blog, Netflix TechBlog, retrieved Apr. 1, 2021,6 pages, https://netflixtechblog.com/janitor-monkey-keeping-the-cloud-tidy-and-clean-d517ad74d648.

IDENTIFYING OUTDATED CLOUD COMPUTING SERVICES

RELATED APPLICATION

This application is a continuation of U.S. patent application Ser. No. 18/159,181, filed Jan. 25, 2023, which is a continuation of U.S. patent application Ser. No. 17/308,731, filed May 5, 2021 (now U.S. Pat. No. 11,570,263), the contents of which are incorporated herein by reference in their entireties.

BACKGROUND

Cloud computing provides on-demand availability of a cloud computing resource, such as a compute service, a database service, and/or a database service, via a network (e.g., the Internet). A large cloud typically has servers located across multiple different regions to provide cloud computing resources with low latency and/or high redundancy.

SUMMARY

In some implementations, a system for identifying outdated cloud computing services includes one or more memories, and one or more processors, communicatively coupled to the one or more memories, configured to: receive a request that includes a user identifier of a user associated with an entity that has multiple accounts associated with a cloud computing provider; execute, based on receiving the request, code to identify a set of accounts, of the multiple accounts, associated with the user identifier; execute a set of functions, corresponding to the set of accounts, that search configuration data for the user identifier, wherein each function, of the set of functions, searches for the user identifier in a subset of the configuration data associated with an account, of the set of accounts, corresponding to that function; identify, based on executing the set of functions, a set of deployed cloud computing services associated with the user identifier, wherein the set of deployed cloud computing services is associated with at least one account of the multiple accounts; identify one or more deployed cloud computing services, of the set of deployed cloud computing services, that are outdated; and transmit, for presentation via a user device, user interface information that identifies the set of deployed cloud computing services, associated with the user identifier, and the one or more deployed cloud computing services that are outdated.

In some implementations, a method for identifying outdated cloud computing services includes storing, by a system, configuration data separately for each account of multiple accounts that an entity has with a cloud computing provider; aggregating, by the system, the configuration data into a data structure that stores the configuration data together for the multiple accounts; receiving, by the system, a request that includes a user identifier of a user associated with the entity; searching, by the system, for the user identifier in the data structure; identifying, by the system, a set of deployed cloud computing services associated with the user identifier based on searching for the user identifier in the data structure, wherein the set of deployed cloud computing services is associated with more than one account of the multiple accounts; identifying, by the system, one or more deployed cloud computing services, of the set of deployed cloud computing services, that are outdated; and transmitting, by the system, information that identifies the set of deployed cloud computing services and the one or more deployed cloud computing services that are outdated.

In some implementations, a non-transitory computer-readable medium storing a set of instructions for identifying outdated cloud computing services includes one or more instructions that, when executed by one or more processors of a system, cause the system to: receive a request that includes a user identifier of a user associated with an entity that has multiple accounts associated with a cloud computing provider; execute a set of functions, corresponding to the set of accounts of the multiple accounts, to search a data structure for the user identifier, wherein each function, of the set of functions, searches for the user identifier using an account identifier associated with an account, of the set of accounts, corresponding to that function; identify, based on executing the set of functions, a set of deployed cloud computing services associated with the user identifier; identify one or more deployed cloud computing services, of the set of deployed cloud computing services, that are outdated; and output information that identifies the one or more deployed cloud computing services that are outdated.

DETAILED DESCRIPTION

The following detailed description of example implementations refers to the accompanying drawings. The same reference numbers in different drawings may identify the same or similar elements.

A cloud computing provider may provide a set of cloud computing services to an entity (e.g., a company, an organization, or an institution) via a cloud computing environment. The entity may have multiple accounts with the cloud computing provider, such that each of the multiple accounts may have access to different subsets of the set of cloud computing services. Further, the entity may be associated with a plurality of users (e.g., employees of the entity or other individuals associated with the entity) who may each have access to particular accounts of the multiple accounts. Accordingly, a large number of cloud computing resources may be deployed to various users of the entity. For example, the cloud computing provider may deploy a first group of cloud computing resources to a first user, of the plurality of users, via one or more accounts, of the multiple accounts of the entity, that are accessible to the first user; may deploy a second group of cloud computing resources to a second user, of the plurality of users, via one or more accounts, of the multiple accounts of the entity, that are accessible to the second user; and so on. Consequently, some cloud computing resources may remain deployed even after users no longer need the cloud computing resources (e.g., even after the cloud computing resources have not been actively used for a period of time), in which case the cloud computing resources become outdated. This can occur when users are removed from an account or otherwise fail to release deployment of no longer needed cloud computing resources.

Maintaining a deployment of outdated cloud computing resources can lead to an unnecessary use or allocation of computing resources (e.g., processing resources, memory resources, communication resources, and/or power resources, among other examples). Further, by maintaining deployment of the outdated cloud computing resources, computing resources that could otherwise be used to provide active cloud computing resources are not available, which may impact a performance of the active cloud computing resources or other resources of a cloud computing environment.

Some implementations described herein provide a system for identifying outdated cloud computing services that are deployed via a cloud computing environment. In some implementations, the system may store configuration data separately for each account of multiple accounts that an entity has with a cloud computing provider and may aggregate the configuration data into a data structure that stores the configuration data together for the multiple accounts. The system may receive a request to view a list of cloud computing services currently deployed in connection with a user identifier of a user that is associated with the entity. Based on receiving the request, the system may execute code (e.g., a serverless compute service function, also referred to as a lambda function) to identify a set of accounts, of the multiple accounts, associated with the user identifier and may execute a set of functions (e.g., a set of other lambda functions), corresponding to the set of accounts, that search the aggregated configuration data for the user identifier. In some implementations, the system may identify, based on executing the set of functions, a set of deployed cloud computing services associated with the user identifier and at least one account of the multiple accounts. The system then may identify one or more deployed cloud computing services, of the set of deployed cloud computing services, that are outdated. The system may transmit information that identifies the set of deployed cloud computing services and the one or more deployed cloud computing services that are outdated. For example, the system may transmit the information as user interface information for presentation via a user device.

In this way, the system may identify outdated cloud computing services of the cloud computing environment. Accordingly, a user of the user device may communicate with the system to cause the outdated cloud computing services to be deleted (e.g., cause the outdated cloud computing services to be released or otherwise no longer be deployed). Additionally, or alternatively, the system may automatically cause the outdated cloud computing services to be deleted (e.g., after a threshold amount of time has elapsed). In this way, the system may reduce unnecessary use or allocation of computing resources (e.g., processing resources, memory resources, communication resources, and/or power resources, among other examples) to maintain a deployment of outdated cloud computing resources. Accordingly, this may allow computing resources, that would otherwise be used to provide the outdated cloud computing resources, to provide or to support active cloud computing resources. This may improve a performance of the active cloud computing resources or other resources of the cloud computing environment.

FIGS. 1A-1E are diagrams of an example 100 associated with identifying outdated cloud computing services. As shown in FIGS. 1A-1E, example 100 includes a cloud computing system, a cloud tracking system, and/or a user device. These devices are described in more detail in connection with FIGS. 2 and 3.

Figure 1A:
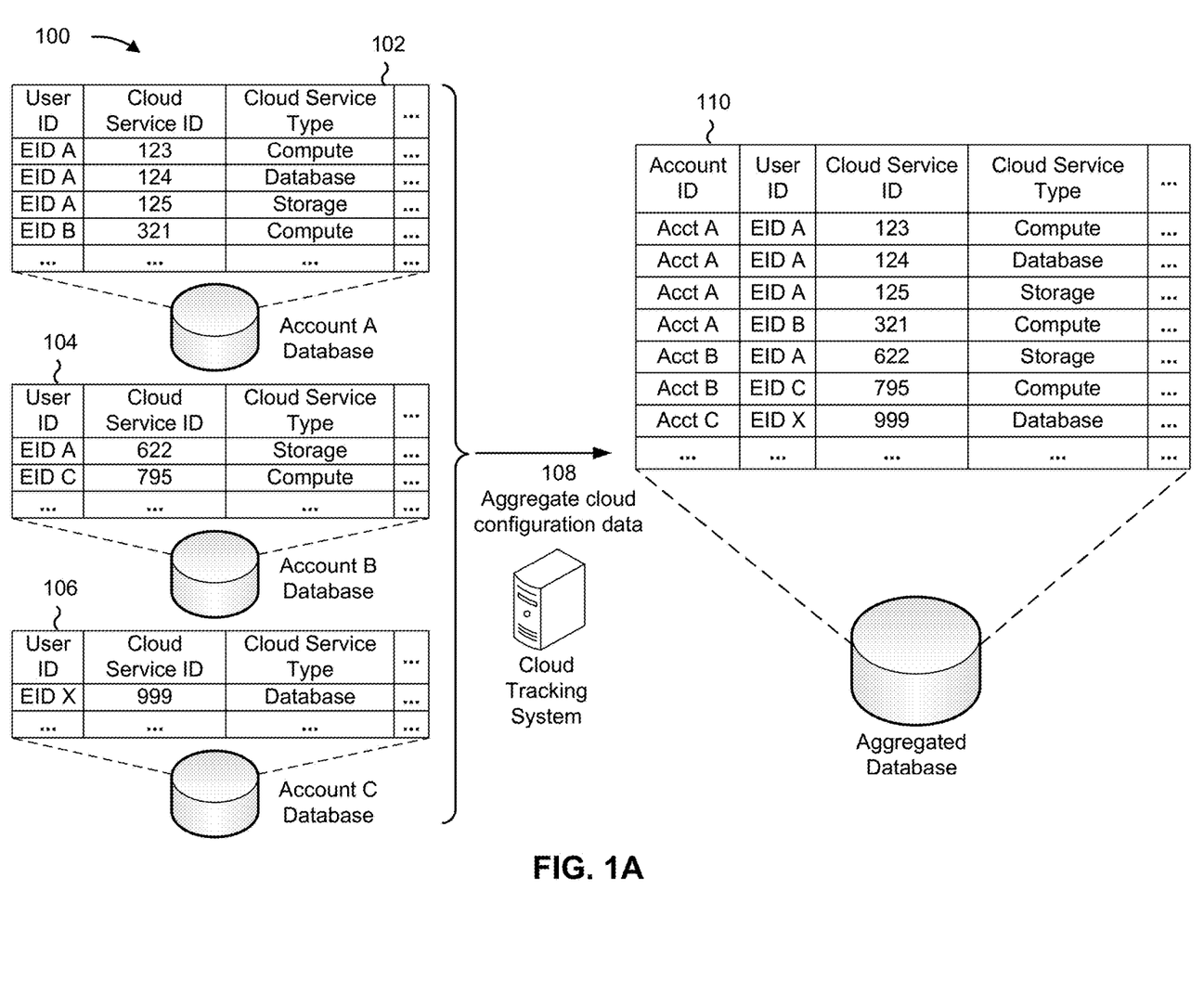
FIGS. 1A-1E are diagrams of an example implementation relating to identifying outdated cloud computing services.

The cloud computing system may be associated with a cloud computing provider and may provide one or more cloud computing services, such as a compute service, a database service, a storage service, an analytics service, a mobile application service, an enterprise application service, and/or a security service, among other examples. An account (e.g., that is associated with an entity, or a subgroup of the entity) may subscribe to a set of cloud computing services of the one or more cloud computing services. Accordingly, the cloud computing system may provide (e.g., may deploy) the set of cloud computing services to users of the account (e.g., users that are associated with the entity or the subgroup of the entity). The entity may be a company, an organization, or an institution, among other examples.

The cloud tracking system may store and/or maintain a data structure for one or more accounts of an entity that are serviced by the cloud computing system. The data structure may include configuration data that indicates, for an account associated with the data structure, information identifying one or more users of the account (e.g., that have access to at least one cloud computing service of the set of cloud computing services associated with the account); information identifying at least one deployed cloud computing service, of the set of cloud computing services associated with the account, which the user is able to access; and/or information indicating a type of the at least one deployed cloud computing service; among other examples. In this way, the cloud tracking system may store configuration data separately for each account, of multiple accounts, that an entity has with a cloud computing provider.

For example, as shown in FIG. 1A, and by reference number 102, the cloud tracking system may store and maintain a first data structure for Account A of an entity (e.g., shown as Account A Database) that includes configuration data represented as a plurality of entries, where an entry includes a User ID of a user of Account A, a Cloud Service ID of a cloud computing service that has been deployed for the user, and a Cloud Service Type ID of the cloud computing service. For example, as further shown in relation to reference number 102, a first entry of the first data structure includes a User ID of EID (e.g., employee ID) A, a Cloud Service ID of 123, and a Cloud Service Type of Compute; a second entry of the first data structure includes a User ID of EID A, a Cloud Service ID of 124, and a Cloud Service Type of Database; a third entry of the first data structure includes a User ID of EID A, a Cloud Service ID of 125, and a Cloud Service Type of Storage; a fourth entry of the first data structure includes a User ID of EID B, a Cloud Service ID of 321, and a Cloud Service Type of Compute; and so on. In another example, as shown by reference number 104, the cloud tracking system may store and maintain a second data structure for Account B of the entity (e.g., shown as Account B Database) that includes configuration data represented as a plurality of entries, where a first entry of the second data structure includes a User ID of EID A, a Cloud Service ID of 622, and a Cloud Service Type of Storage; a second entry of the second data structure includes a User ID of EID C, a Cloud Service ID of 795, and a Cloud Service Type of Compute; and so on. In an additional example, as shown by reference number 106, the cloud tracking system may store and maintain a third data structure for Account C of the entity (e.g., shown as Account C Database) that includes configuration data represented as a plurality of entries, where a first entry of the third data structure includes a User ID of EID X, a Cloud Service ID of 999, and a Cloud Service Type of Database, and so on.

As further shown in FIG. 1A, and by reference number 108, the cloud tracking system may aggregate the configuration data (e.g., that is stored and/or maintained in the separate data structures) into a single data structure. In some implementations, the cloud tracking system may cause a respective account identifier to be included with each subset (or each portion) of the configuration data that associates the subset (or the portion) of the configuration data with a corresponding account. In this way, the single data structure stores the configuration data together for multiple accounts of the entity.

For example, as shown by reference number 110, the cloud tracking system may store and maintain an aggregated data structure (e.g., shown as Aggregated Database) that includes configuration data (e.g., that has been aggregated from the respective configuration data of the first data structure, the second data structure, and the third data structure) represented as a plurality of entries, where an entry includes an Account ID of an account of the entity, a User ID of a user of the account, a Cloud Service ID of a cloud computing service that has been deployed for the user of the account, and a Cloud Service Type ID of the cloud computing service. Accordingly, as further shown in relation to reference number 110, entries of a first set of entries (e.g., that is associated with the plurality of entries included in the first data structure) may each include an Account ID of Acct A, entries of a second set of entries (e.g., that is associated with the plurality of entries included in the second data structure) may each include an Account ID of Acct B, entries of a third set of entries (e.g., that is associated with the plurality of entries included in the third data structure) may each include an Account ID of Acct C, and so on.

Figure 1B:
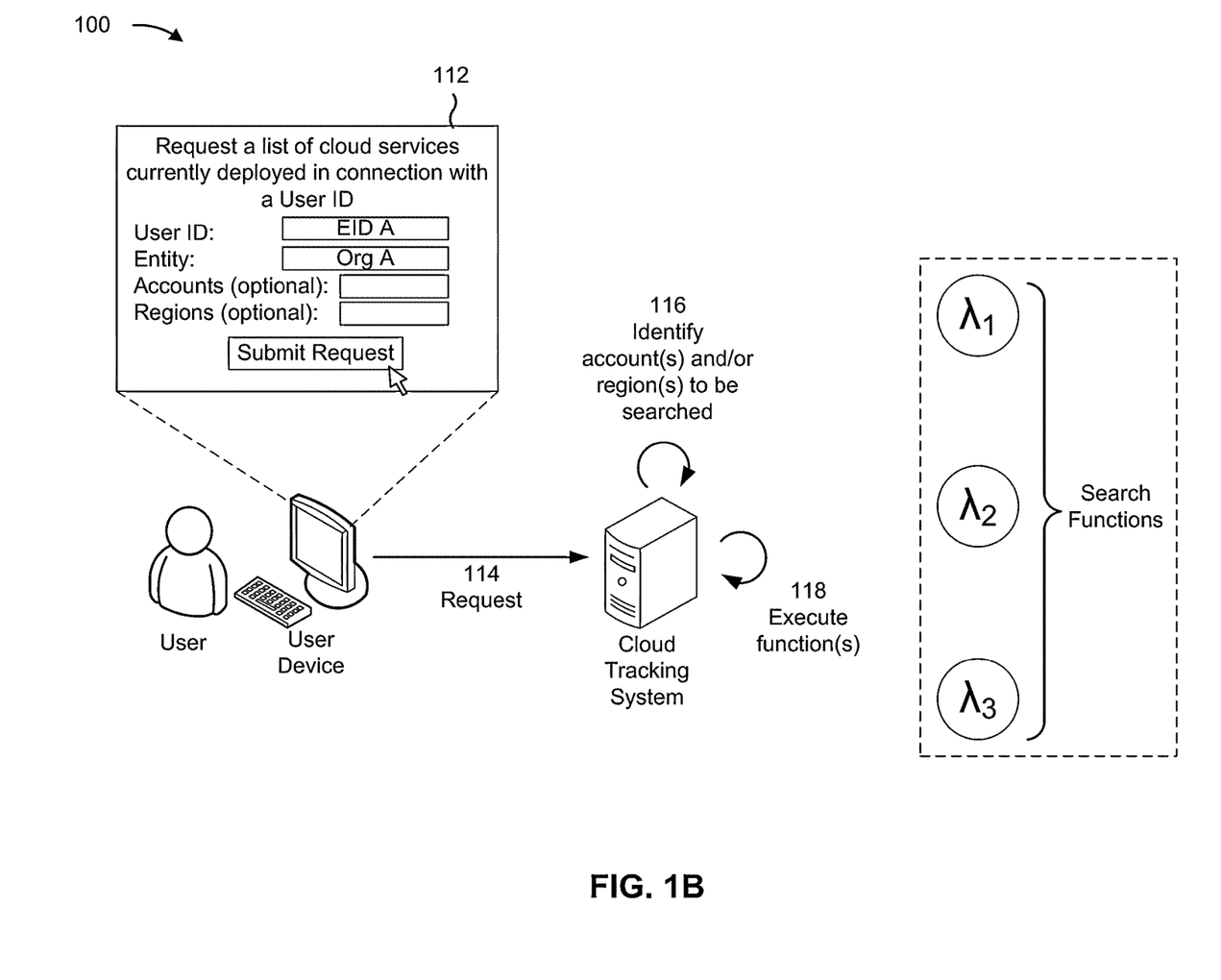

As shown in FIG. 1B, and by reference number 112, a user of the user device may interact with the user device (e.g., via a user interface provided by the user device). In some implementations, the user may input (e.g., via the user interface) a request (e.g., to view a list of cloud computing services currently deployed in connection with a user identifier) to the user device. The request may include a user identifier of a user (e.g., the user of the user device, or another user of an entity) and/or an entity identifier of the entity. For example, as further shown in relation to reference number 112, the user may input a request for a list of cloud services deployed in connection with a User ID of EID A and an Entity of Org A. The entity may have multiple accounts with a cloud computing provider and/or may be associated with one or more regions (e.g., geographical areas in which the entity uses cloud computing services). In some implementations, the request may include an identifier of a set of accounts (e.g., that are either accessible and/or inaccessible to the user identified by the user identifier), of the multiple accounts, and/or an identifier of a set of regions of the one or more regions.

As further shown in FIG. 1B, and by reference number 114, the user device may provide (e.g., transmit) the request to the cloud tracking system. In some implementations, as shown by reference number 116, the cloud tracking system may process the request (e.g., upon receiving the request from the user device) to identify the set of accounts and/or the set of regions (e.g., that are to be searched for information associated with cloud computing services currently deployed in connection with the user identifier and/or the entity identifier included in the request).

For example, when the request includes the identifier of the set of accounts and/or the identifier of the set of regions, the cloud tracking system may parse the request to identify the set of accounts and/or the set of regions. As another example, when the request includes the user identifier and/or the entity identifier (and does not include the identifier of the set of accounts and the identifier of the set of regions), the cloud tracking system may parse the request to identify the user associated with the user identifier and/or the entity associated with the entity identifier. The cloud tracking system then may execute code (e.g., that is associated with a serverless compute service function, also referred to as a lambda function) to identify a set of accounts and/or a set of regions (e.g., that are associated with the user and/or the entity). Executing the code may cause the cloud tracking system to search, based on the user identifier, a data structure that stores information identifying the multiple accounts of the entity and/or the one or more regions associated with the entity. Accordingly, based on searching the data structure, the cloud tracking system may identify the set of accounts and/or the set of regions that are associated with the user (e.g., that are accessible using the user identifier included in the request). In some implementations, the cloud tracking system may identify the set of accounts as including all of the multiple accounts of the entity (e.g., regardless of whether the user identifier has access to all of the multiple accounts) and/or may identify the set of regions as including all of the one or more regions associated with the entity (e.g., regardless of whether the user identifier is associated with the one or more regions).

In some implementations, the cloud tracking system may identify and/or generate a set of search functions (shown as search functions $\lambda_1$ through $\lambda_3$ in FIG. 1B). For example, the cloud tracking system may identify and/or generate a search function for each account of the set of accounts and/or for each region of the set of regions. Accordingly, the set of search functions may correspond to the set of accounts and/or the set of regions (e.g., the set of search functions may have one-to-one correspondence with the set of accounts and/or the set of regions).

A search function (e.g., a search function $\lambda$), of the set of functions, may be configured to search configuration data (e.g., that is stored in the aggregated data structure shown in FIG. 1A). For example, the search function may be configured to search for the user identifier (e.g., that was included in the request) in a subset, or a portion, of the configuration data that is associated with an account, of the set of accounts, that corresponds to the function (or that is associated with a region, of the set of regions, that corresponds to the function). Put another way, the search function may correspond to an account, of the set of accounts, and may be configured to identify one or more entries of the configuration data that includes an account identifier that matches the account and may be configured to search the one or more entries to identify a set of entries that are associated with the user identifier. In some implementations, the search function may be a lambda function (e.g., a serverless compute service function).

Figure 1C:
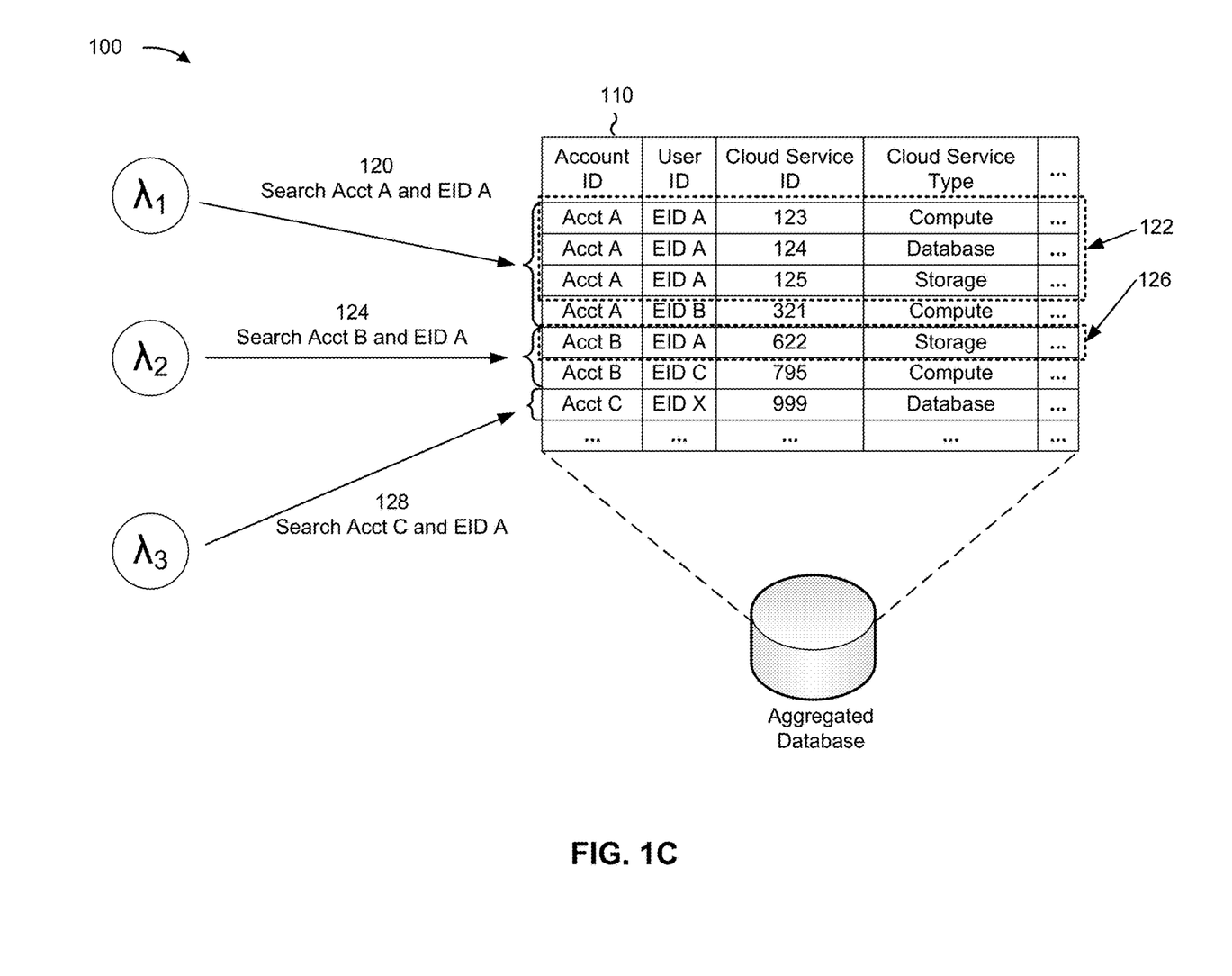

As further shown in FIG. 1B, and by reference number 118, the cloud tracking system may execute the set of search functions. For example, as shown in FIG. 1C, the cloud tracking system may execute a set of search functions, which includes search functions $\lambda_1$ through $\lambda_3$ (e.g., that were shown in FIG. 1B), to search the configuration data included in the aggregated data structure (e.g., shown as the Aggregated Database) for the user identifier EID A (that was included in the request, as described herein in relation to FIG. 1B and reference number 112). As further shown in FIG. 1C, and in relation to reference number 120, the cloud tracking system may execute the search function $\lambda_1$ that is associated with an Acct A of the entity Org A. Accordingly, when executing the search function $\lambda_1$, the cloud tracking system may search for the user identifier EID A in a subset (or portion) of the configuration data associated with Acct A. In this way, as shown in relation to reference number 122, the cloud tracking system may identify the first three entries of the configuration data as associated with the user identifier EID A and the account Acct A.

As further shown in FIG. 1C, and in relation to reference number 124, the cloud tracking system may execute the search function $\lambda_2$ that is associated with an Acct B of the entity Org A. Accordingly, when executing the search function $\lambda_2$, the cloud tracking system may search for the user identifier EID A in a subset (or portion) of the configuration data associated with Acct B. In this way, as shown in relation to reference number 126, the cloud tracking system may identify the fifth entry of the configuration data as associated with the user identifier EID A and the account Acct B. As further shown in FIG. 1C, and in relation to reference number 128, the cloud tracking system may execute the search function $\lambda_3$ that is associated with an Acct C of the entity Org A. Accordingly, when executing the search function $\lambda_3$, the cloud tracking system may search for the user identifier EID A in a subset (or portion) of the configuration data associated with Acct C. In this way, the cloud tracking system may determine that no entry of the configuration data is associated with the user identifier EID A and the account Acct C.

Figure 1D:
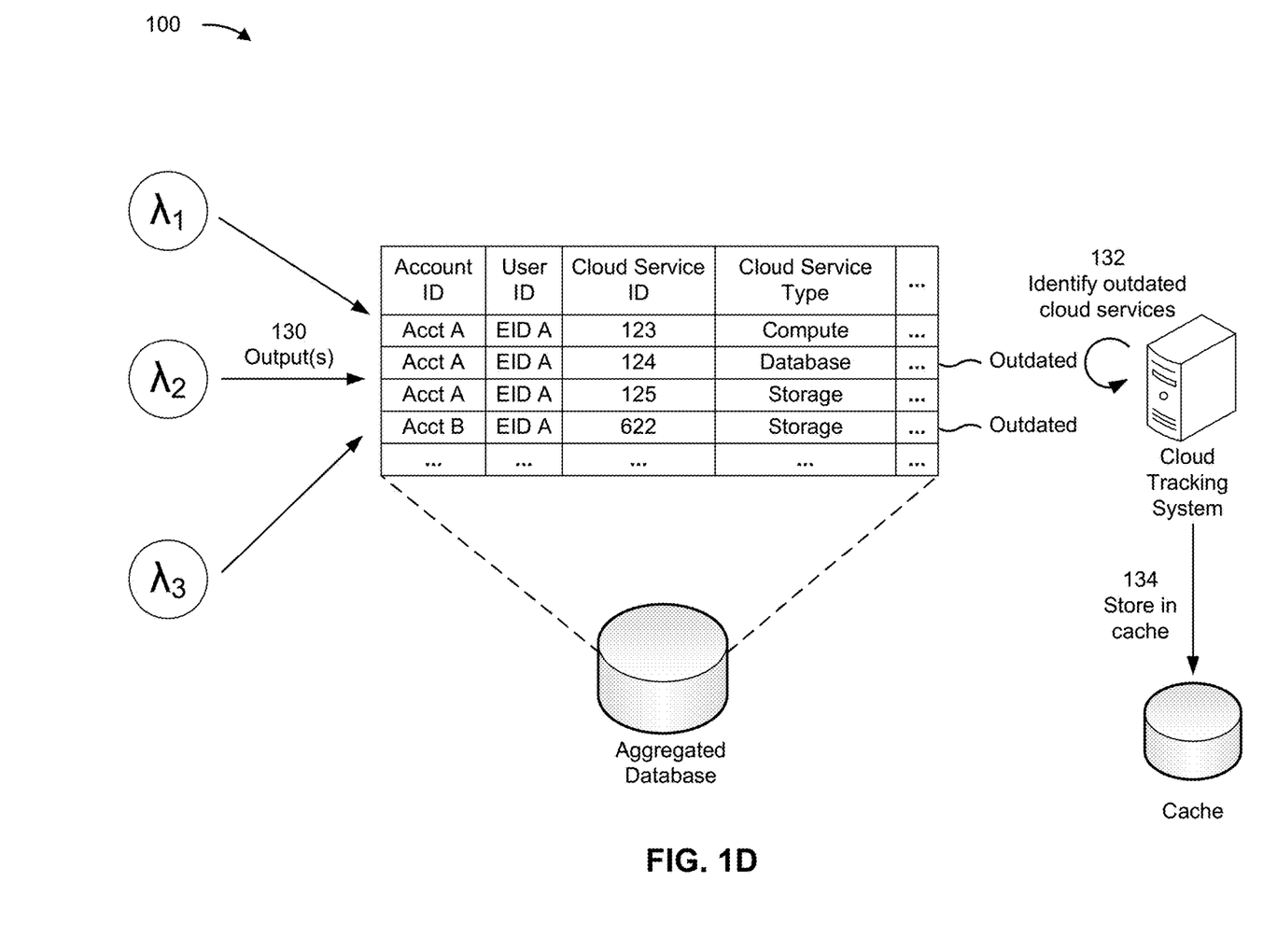

As shown in FIG. 1D, and in relation to reference number 130, the cloud tracking system may receive, based on executing the set of search functions, a set of outputs. For example, each search function, of the set of search functions, may generate an output of the set of outputs. An output may identify zero or more cloud computing services associated with the user identifier for the account that corresponds to the search function that generated the output. For example, an output of the search function $\lambda_1$ may include the first three entries of the configuration data (that is included in the Aggregated Database) that are associated with the user identifier EID A and the account Acct A. As another example, an output of the search function $\lambda_2$ may include the fifth entry of the configuration data (that is included in the Aggregated Database) that is associated with the user identifier EID A and the account Acct B. In an additional example, an output of the search function $\lambda_3$ may include no entry of the configuration data (that is included in the Aggregated Database) that is associated with the user identifier EID A and the account Acct C (e.g., because the user identifier EID A does not have access to the account Acct C).

In some implementations, the cloud tracking system may aggregate the set of outputs to generate a set of entries associated with the user identifier. For example, as shown in FIG. 1D, the cloud tracking system may aggregate the outputs to generate a set of entries associated with the user identifier EID A. The cloud tracking system may process the set of entries to identify a set of deployed cloud computing services associated with the user identifier EID A. For example, as shown in FIG. 1D, the cloud tracking system may parse the set of entries associated with the user identifier EID A to determine that a compute resource (e.g., with Cloud Service ID 123), a database resource (e.g., with Cloud Service ID 124), a storage resource (e.g., with Cloud Service ID 125), and a storage resource (e.g., with Cloud Service ID 622) are deployed for the user identifier EID A.

As further shown in FIG. 1D, and by reference number 132, the cloud tracking system may identify one or more deployed cloud computing services, of the set of deployed cloud computing services, that are outdated. For example, the cloud tracking system may determine a time at which a file, associated with a deployed cloud computing service of the one or more deployed cloud computing services, was last modified, opened, and/or executed, and may identify the deployed cloud computing service as outdated if a threshold amount of time has elapsed since the file was last modified, opened, and/or executed. The threshold amount of time may depend on a type of the deployed cloud computing service. For example, when the deployed cloud computing service is a compute service, the threshold amount of time may be on the order of seconds, minutes, or hours, such as 10 seconds, 45 seconds, 5 minutes, 30 minutes, 1 hour, or 3 hours, among other examples. As another example, when the deployed cloud computing service is a database service or a storage service, the threshold amount of time may be on the order of months or years, such as 1 month, 3 months, 9 months, 1 year, 3 years, or 5 years, among other examples. In some implementations, the threshold amount of time may be shorter for a database service as compared to a storage service. For example, when the deployed cloud computing service is a database service, the threshold amount of time may be on the order of months, such as 1 month, 3 months, or 9 months, among other examples, and when the deployed cloud computing service is a storage service, the threshold amount of time may on the order of years, such as 1 year, 3 years, or 5 years, among other examples.

As further shown in FIG. 1D, and reference number 134, the cloud tracking system may store information in a cache. For example, the cloud tracking system may store, in the cache, the user identifier in connection with information that identifies the set of deployed cloud computing services and/or information that identifies the one or more deployed cloud computing services, of the set of deployed cloud computing services, that are outdated.

In some implementations, the cloud tracking system may obtain information from the cache to determine when a prior request that includes the user identifier was received by the cloud tracking system. In some implementations, the cloud tracking system may determine that a threshold amount of time (e.g., 30 minutes, 2 hours, 20 hours, 1 day, or 5 days, among other examples) has elapsed between the request and the prior request (e.g., which indicates that the information in the cache is stale) and therefore the cloud tracking system may process the request in the manner described herein in relation to FIGS. 1B-1D. Alternatively, the cloud tracking system may determine that a threshold amount of time has not elapsed between the request and the prior request (e.g., which indicates that the information in the cache is new) and therefore the cloud tracking system may refrain from processing the request. Instead, the cloud tracking system may process the information stored in the cache (e.g., to identify the one or more deployed cloud computing services, of the set of deployed cloud computing services, that are outdated).

Figure 1E:
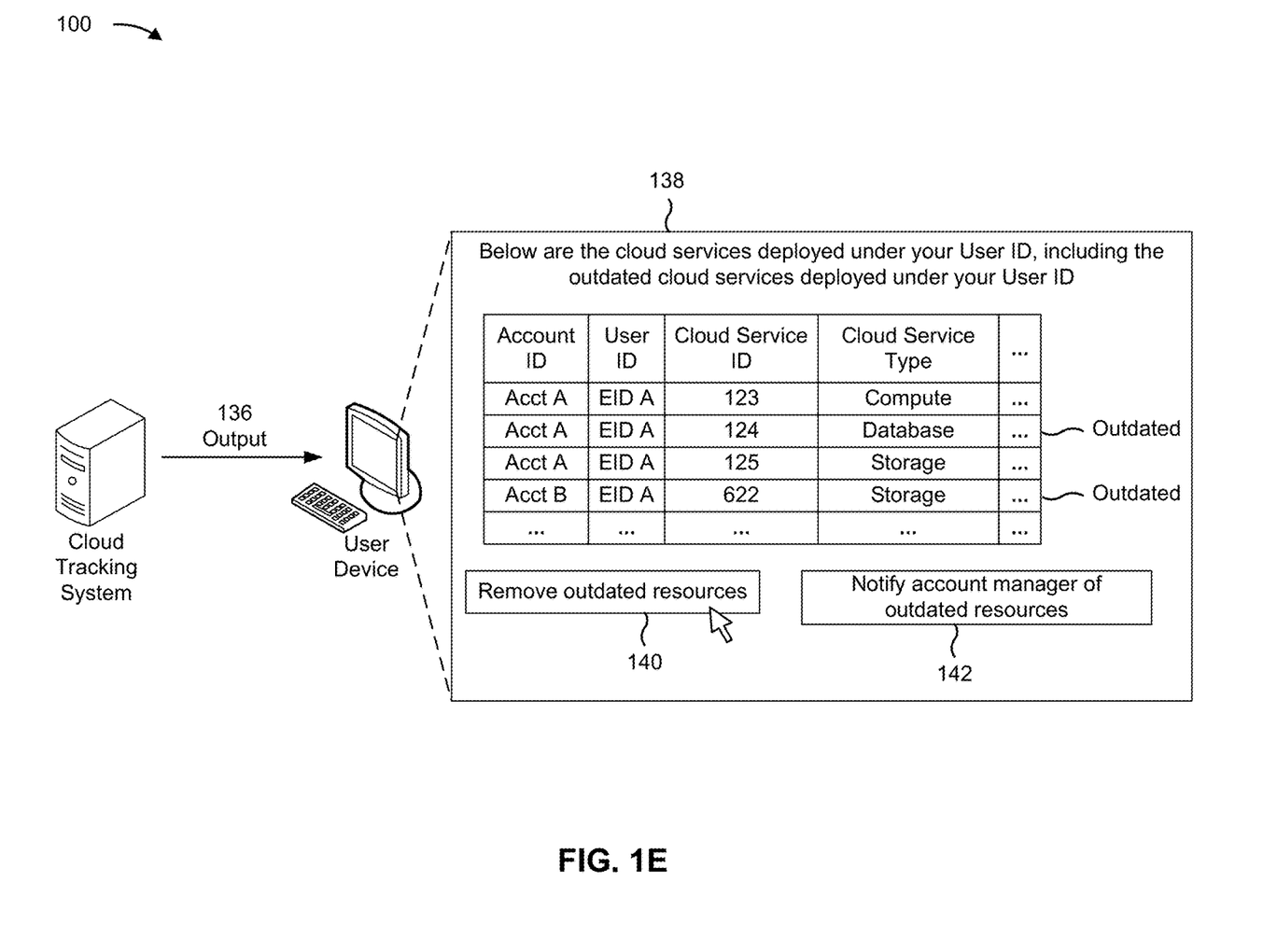

As shown in FIG. 1E, and by reference number 136, the cloud tracking system may output information (e.g., to the user device). The information may identify the set of deployed cloud computing services (e.g., that is associated with the user identifier) and/or information that identifies the one or more deployed cloud computing services, of the set of deployed cloud computing services, that are outdated. In some implementations, the cloud tracking system may transmit the information as user interface information to the user device. The user device then may present the user interface information (e.g., via the display of the user device). For example, as shown in FIG. 1E and in relation to reference number 138, the user device may present user interface information that identifies the set of deployed cloud computing services that are associated with the user identifier EID A and the one or more deployed cloud computing services, of the set of deployed cloud computing services, that are outdated (e.g., shown with Outdated flags).

In another example, the cloud tracking system may identify, based on searching one or more data structures (e.g., that are associated with a cloud computing service of the set of deployed cloud computing services), a vulnerability associated with the deployed cloud computing service, and may output information that identifies the vulnerability and the deployed cloud computing service associated with the vulnerability. The vulnerability may be, for example, a resource vulnerability (e.g., due to a resource not being updated because the resource is deployed).

As further shown in FIG. 1E, a user of the user device may interact with the user device (e.g., via the user interface that is presented via the display of the user device). In some implementations, the user may input a request to delete at least one deployed cloud computing service (e.g., of the one or more deployed cloud computing services that are outdated). For example, as shown by reference number 140, the user may select (e.g., via the user interface) an option to remove outdated resources. The user device may transmit the request to the cloud tracking system, which may delete (or may cause to be deleted) the at least one deployed cloud computing service (e.g., based on receiving the request).

Additionally or alternatively, the user may input a request to notify an account manager of at least one deployed cloud computing service (e.g., of the one or more deployed cloud computing services that are outdated). For example, as shown by reference number 142, the user may select (e.g., via the user interface) an option to notify the account manager of outdated resources. The user device may transmit the request to the cloud tracking system, which may generate and send a message (e.g., an email message, a text message, a notification message, and/or a secure message, among other examples) to a user device associated with an account manager that is associated with an account of the at least one deployed cloud computing service that is outdated. The message may indicate that the at least one deployed cloud computing service is outdated and/or should be deleted.

In some implementations, the cloud tracking system may automatically delete the one or more deployed cloud computing services that are outdated. In some implementations, the cloud tracking system may delete the one or more deployed cloud computing services after a threshold amount of time has elapsed. For example, the cloud tracking system may determine a time at which the cloud tracking system identified the one or more deployed cloud computing services that are outdated, and may delete the one or more deployed cloud computing services that are outdated if a threshold amount of time has elapsed since the identification. The threshold amount of time may be on the order of, for example, minutes, hours, or days, such as 10 minutes, 45 minutes, 5 hours, 10 days, or 30 days.

As indicated above, FIGS. 1A-1E are provided as an example. Other examples may differ from what is described with regard to FIGS. 1A-1E.

Figure 2:
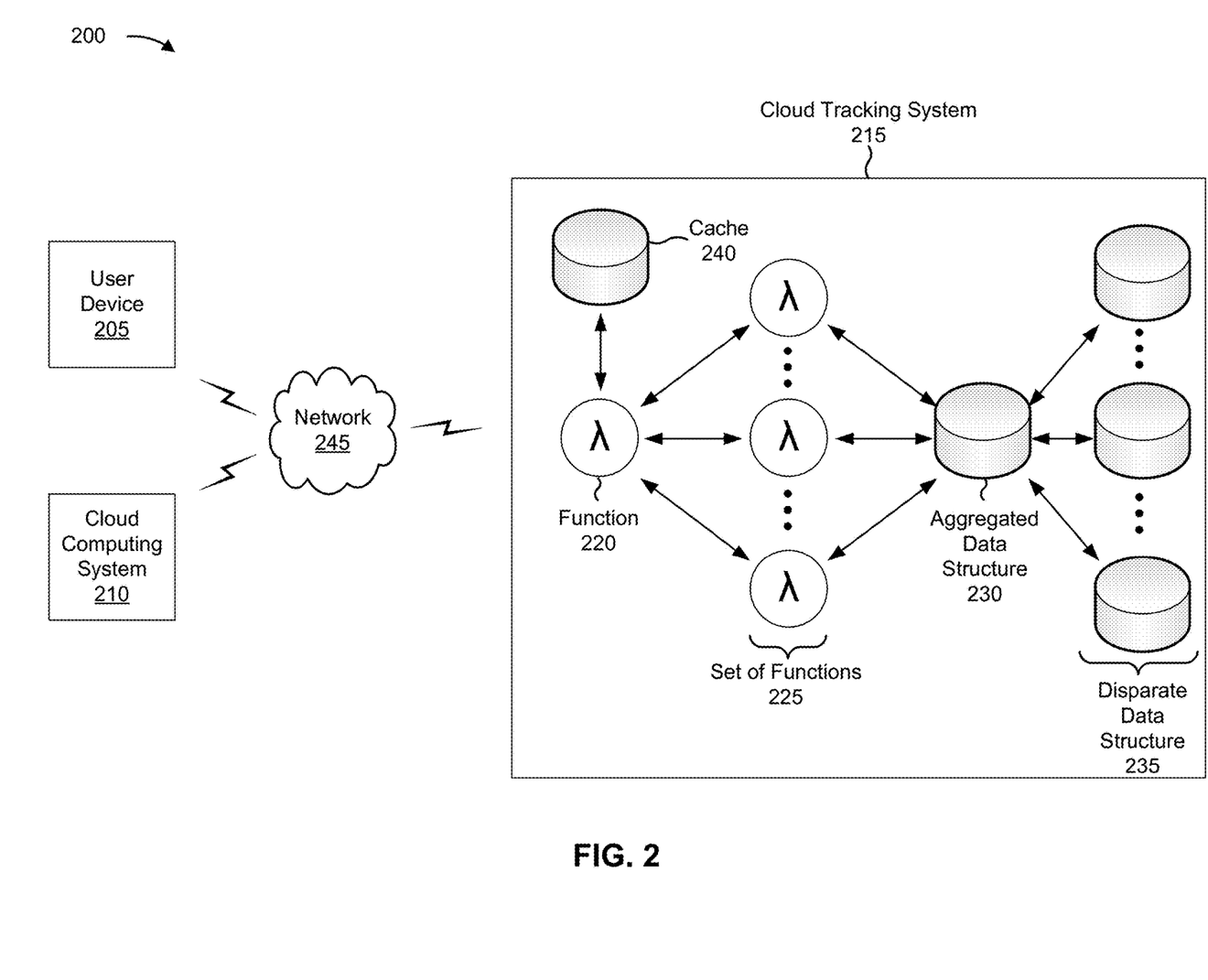
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a cloud computing system 210, cloud tracking system 215 (e.g., that includes a function 220, a set of functions 225, an aggregated data structure 230, a set of disparate data structures 235, and/or a cache 240), and a network 245. Devices of environment 200 may interconnect via wired connections, wireless connections, or a combination of wired and wireless connections.

The user device 205 includes one or more devices capable of receiving, generating, storing, processing, and/or providing information associated with identifying outdated cloud computing services, as described elsewhere herein. The user device 205 may include a communication device and/or a computing device. For example, the user device 205 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 210 includes one or more devices capable of receiving, generating, storing, processing, and/or providing (e.g., deploying) cloud computing services, as described elsewhere herein. The cloud computing system 210 may include a communication device and/or a computing device. For example, the cloud computing system 210 may include a server, an application server, a client server, a web server, a database server, a host server, a proxy server, a virtual server (e.g., executing on computing hardware), a device that includes computing hardware used in a cloud computing environment, or a similar type of device. The cloud computing system 210 may communicate with one or more other devices of environment 200, as described elsewhere herein.

The cloud tracking system 215 includes one or more devices capable of receiving, generating, storing, processing, and/or providing information associated with identifying outdated cloud computing services, as described elsewhere herein. The cloud tracking system 215 may include a communication device and/or a computing device. For example, the cloud tracking system 215 may include a server, an application server, a client server, a web server, a database server, a host server, a proxy server, a virtual server (e.g., executing on computing hardware), a device that includes computing hardware used in a cloud computing environment, or a similar type of device. In some implementations, the cloud tracking system 215 may include the aggregated data structure 230, the set of disparate data structures 235, and/or the cache 240. In some implementations, the cloud tracking system may execute the function 220 and/or the set of functions 225, as described elsewhere herein. The cloud tracking system 215 may communicate with one or more other devices of environment 200, as described elsewhere herein.

The function 220 may include a serverless compute service function, also referred to as a lambda function. The function 220 may be configured to identify a set of accounts and/or a set of regions that are associated with a user and/or an entity, as described elsewhere herein.

The set of functions 225 may include one or more serverless compute service functions (e.g., one or more lambda search functions). A function, of the set of functions 225, may be associated with an account, of the set of accounts, or a region, of the set of regions, and may be configured to search for a user identifier in a subset, or a portion, of configuration data (e.g., that is stored in the aggregated data structure 230) that is associated with the account or the region, as described elsewhere herein.

The aggregated data structure 230 includes one or more devices capable of receiving, generating, storing, processing, and/or providing information associated with configuration data, as described elsewhere herein. The aggregated data structure 230 may include a communication device and/or a computing device. For example, the aggregated data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The aggregated data structure 230 may communicate with one or more other devices of environment 200, as described elsewhere herein.

The set of disparate data structures 235 includes one or more devices capable of receiving, generating, storing, processing, and/or providing information associated with configuration data, as described elsewhere herein. The set of disparate data structures 235 may include a communication device and/or a computing device. For example, the set of disparate data structures 235 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The set of disparate data structures 235 may communicate with one or more other devices of environment 200, as described elsewhere herein.

The cache 240 includes one or more devices capable of receiving, generating, storing, processing, and/or providing information associated with a user identifier in connection with information that identifies a set of deployed cloud computing services and/or information that identifies one or more deployed cloud computing services, of the set of deployed cloud computing services, that are outdated, as described elsewhere herein. The cache 240 may include a communication device and/or a computing device. For example, the cache 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The cache 240 may communicate with one or more other devices of environment 200, as described elsewhere herein.

The network 245 includes one or more wired and/or wireless networks. For example, the network 245 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 245 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
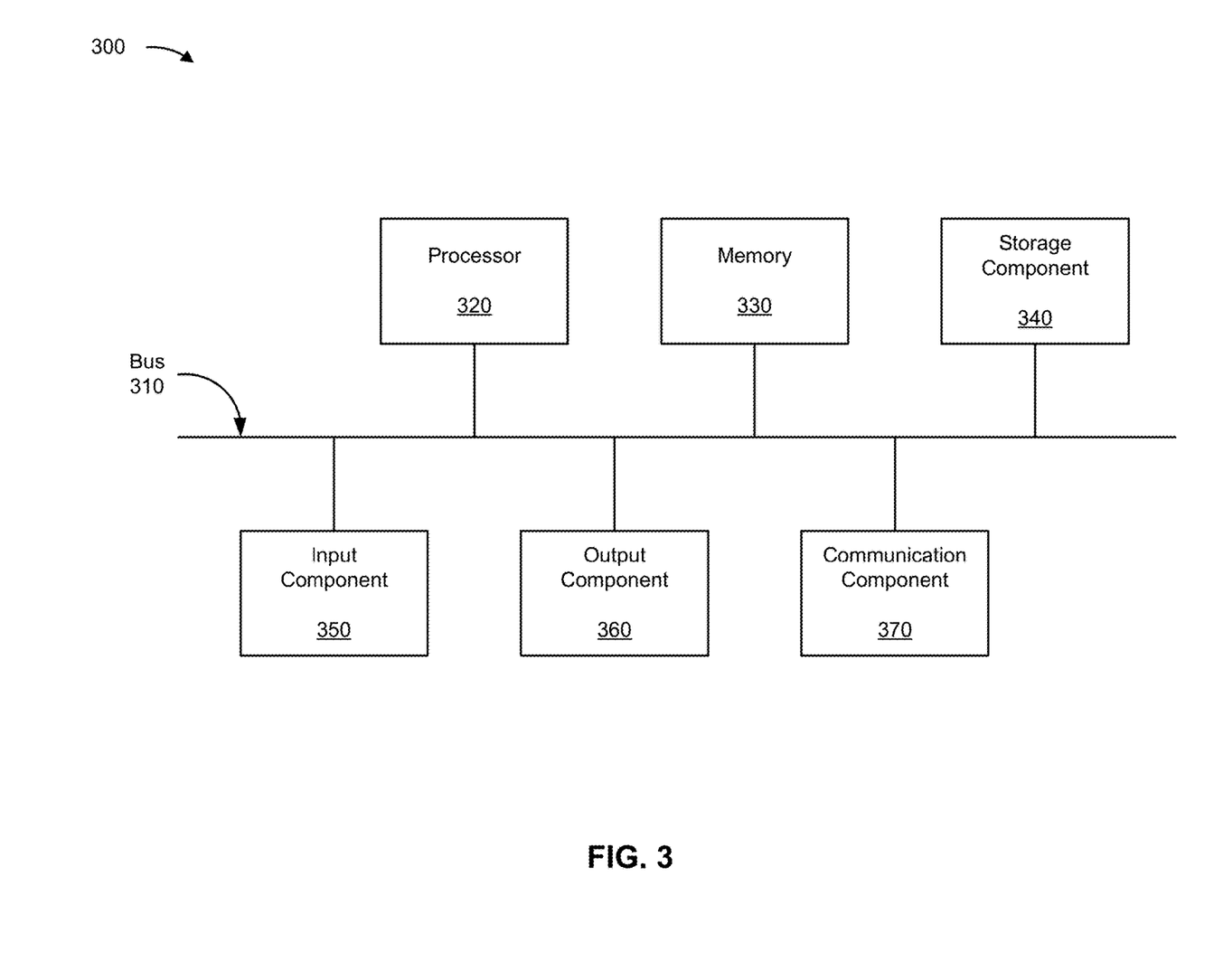
FIG. 3 is a diagram of example components of one or more devices of FIG. 2.

FIG. 3 is a diagram of example components of a device 300, which may correspond to the user device 205, the cloud computing system 210, the cloud tracking system 215, the aggregated data structure 230, the set of disparate data structures 235, and/or the cache 240. In some implementations, the user device 205, the cloud computing system 210, the cloud tracking system 215, the aggregated data structure 230, the set of disparate data structures 235, and/or the cache 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
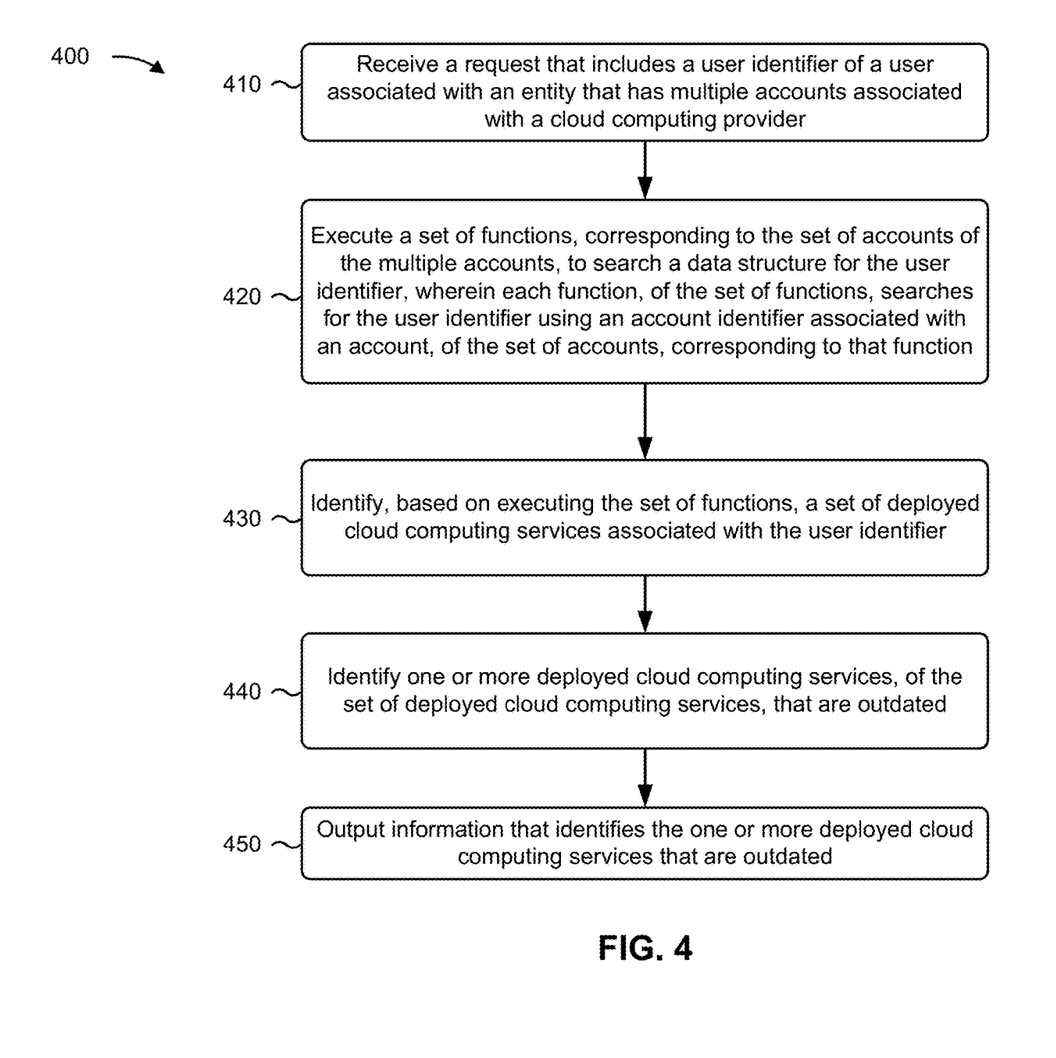
FIG. 4 is a flowchart of an example process relating to identifying outdated cloud computing services.

FIG. 4 is a flowchart of an example process 400 associated with identifying outdated cloud computing services. In some implementations, one or more process blocks of FIG. 4 may be performed by a system (e.g., the cloud tracking system 215). In some implementations, one or more process blocks of FIG. 4 may be performed by another device or a group of devices separate from or including the system, such as a user device (e.g., the user device 205), a cloud computing system (e.g., the cloud computing system 210), an aggregated data structure (e.g., the aggregated data structure 230), a set of disparate data structures (e.g., the set of disparate data structures 235), and/or a cache (e.g., the cache 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a request that includes a user identifier of a user associated with an entity that has multiple accounts associated with a cloud computing provider (block 410). As further shown in FIG. 4, process 400 may include executing a set of functions, corresponding to the set of accounts of the multiple accounts, to search a data structure for the user identifier, wherein each function, of the set of functions, searches for the user identifier using an account identifier associated with an account, of the set of accounts, corresponding to that function (block 420). As further shown in FIG. 4, process 400 may include identifying, based on executing the set of functions, a set of deployed cloud computing services associated with the user identifier (block 430). As further shown in FIG. 4, process 400 may include identifying one or more deployed cloud computing services, of the set of deployed cloud computing services, that are outdated (block 440). As further shown in FIG. 4, process 400 may include outputting information that identifies the one or more deployed cloud computing services that are outdated (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for identifying outdated cloud computing services, the system comprising:
   one or more memories; and
   one or more processors, coupled to the one or more memories, configured to:
      execute, based on an identifier associated with an entity, code to identify one or more regions, of multiple regions in which the entity uses cloud computing services, associated with the identifier;
      execute one or more functions, corresponding to the one or more regions, to search configuration data for the identifier, wherein each function, of the one or more functions, searches for the identifier in a subset of the configuration data associated with a region, of the one or more regions, corresponding to that function;
      identify, based on executing the one or more functions, a set of deployed cloud computing services associated with the identifier, wherein the set of deployed cloud computing services is associated with at least one region of the multiple regions; and
      identify one or more deployed cloud computing services, of the set of deployed cloud computing services, that are outdated.

2. The system of claim 1, wherein the configuration data is stored separately for each region of the multiple regions; and wherein the one or more processors are further configured to:
aggregate the configuration data into a data structure that stores the configuration data for the multiple regions; and
store, in the data structure, a region identifier, for each subset of configuration data, that associates the subset of configuration data with a corresponding region.

3. The system of claim 2, wherein each function, of the one or more functions, searches the configuration data using the region identifier and the identifier.

4. The system of claim 1, wherein the one or more processors, to identify the set of deployed cloud computing services associated with the identifier, are configured to:
receive a set of outputs based on executing the one or more functions, wherein an output for a function identifies zero or more cloud computing services associated with the identifier for a region corresponding to that function; and
aggregate the set of outputs to identify the set of deployed cloud computing services associated with the identifier.

5. The system of claim 1, wherein the identifier is stored in connection with information that identifies the set of deployed cloud computing services.

6. The system of claim 1, wherein the set of deployed cloud computing services includes at least one of a compute service, a database service, or a storage service.

7. The system of claim 1, wherein the one or more regions includes at least one of:
all of the multiple regions; or
one or more regions, of the multiple regions, accessible using the identifier.

8. A method for identifying outdated cloud computing services, comprising:
receiving, by a system, a request that includes an identifier associated with an entity that is associated with cloud computing services in multiple regions;
searching, by the system, for the identifier in a data structure that stores configuration data for each region of the multiple regions;
identifying, by the system, a set of deployed cloud computing services associated with the identifier based on searching for the identifier in the data structure, wherein the set of deployed cloud computing services is associated with more than one region of the multiple regions; and
identifying, by the system, one or more deployed cloud computing services, of the set of deployed cloud computing services, that are outdated.

9. The method of claim 8, further comprising:
transmitting information that identifies the set of deployed cloud computing services and the one or more deployed cloud computing services that are outdated.

10. The method of claim 8, wherein searching for the identifier in the data structure comprises executing one or more functions, corresponding to one or more regions of the multiple regions, to search the data structure for the identifier, wherein each function, of the one or more functions, searches for the identifier in a portion of the data structure associated with a region, of the one or more regions, corresponding to that function.

11. The method of claim 10, wherein aggregating the configuration data into the data structure comprises storing each portion of the configuration data, associated with a different region of the multiple regions, with a region identifier that identifies a region corresponding to that portion of the configuration data; and
wherein each function, of the one or more functions, searches the data structure using the identifier and using a region identifier corresponding to that function.

12. The method of claim 10, wherein the one or more regions includes all of the multiple regions regardless of whether the identifier has access to all of the multiple regions.

13. The method of claim 8, wherein identifying the one or more deployed cloud computing services that are outdated comprises:
determining a time at which a file, associated with a deployed cloud computing service of the one or more deployed cloud computing services, was last modified; and
identifying the deployed cloud computing service as outdated if a threshold amount of time has elapsed since the file was last modified.

14. The method of claim 13, wherein the threshold amount of time depends on a type of the deployed cloud computing service.

15. The method of claim 14, wherein the threshold amount of time is shorter for a database service as compared to a storage service.

16. A non-transitory computer-readable medium storing a set of instructions for identifying outdated cloud computing services, the set of instructions comprising:
one or more instructions that, when executed by one or more processors of a system, cause the system to:
receive an identifier associated with an entity that is associated with cloud computing services in multiple regions;
execute one or more functions, corresponding to one or more regions of the multiple regions, to search a data structure for the identifier, wherein each function, of the set of functions, searches for the identifier using a region identifier associated with a region, of the one or more regions, corresponding to that function;
identify, based on executing the one or more functions, a set of deployed cloud computing services associated with the identifier;
identify one or more deployed cloud computing services, of the set of deployed cloud computing services, that are outdated; and
output information that identifies the one or more deployed cloud computing services that are outdated.

17. The non-transitory computer-readable medium of claim 16, wherein the one or more instructions, that cause the system to identify the one or more deployed cloud computing services that are outdated, cause the system to:
determine an amount of time that has elapsed since a file, associated with a deployed cloud computing service of the one or more deployed cloud computing services, was last modified, opened, or executed; and
identify the deployed cloud computing service as outdated if the amount of time satisfies a threshold.

18. The non-transitory computer-readable medium of claim 16, wherein the one or more instructions, when executed by the one or more processors, further cause the system to:
identify, based on searching one or more data structures, a vulnerability associated with a deployed cloud computing service of the set of deployed cloud computing services; and output information that identifies the vulnerability and the deployed cloud computing service associated with the vulnerability.

19. The non-transitory computer-readable medium of claim 16, wherein the one or more instructions, when executed by the one or more processors, further cause the system to:
receive a request to delete a deployed cloud computing service of the one or more deployed cloud computing services that is outdated; and
delete the deployed cloud computing service based on receiving the request to delete the deployed cloud computing service.

20. The non-transitory computer-readable medium of claim 16, wherein the one or more instructions, when executed by the one or more processors, further cause the system to delete the one or more deployed cloud computing services after a threshold amount of time has elapsed.

* * * * *